US006924797B1

(12) United States Patent
MacPhail

(10) Patent No.: US 6,924,797 B1
(45) Date of Patent: *Aug. 2, 2005

(54) ARRANGEMENT OF INFORMATION INTO LINEAR FORM FOR DISPLAY ON DIVERSE DISPLAY DEVICES

(75) Inventor: Margaret Gardner MacPhail, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/451,942

(22) Filed: Nov. 30, 1999

(51) Int. Cl.$^7$ .................................................. G06F 3/00
(52) U.S. Cl. ...................... 345/326; 715/784; 715/786; 715/864
(58) Field of Search ................................ 345/764, 784, 345/786, 835, 846, 837, 684; 707/100; 715/764, 784, 786, 835, 846, 837, 864

(56) References Cited

U.S. PATENT DOCUMENTS

| | | | | |
|---|---|---|---|---|
| 5,493,692 A | | 2/1996 | Theimer et al. ............ 455/26.1 |
| 5,515,488 A | | 5/1996 | Hoppe et al. ............... 345/440 |
| 5,550,559 A | * | 8/1996 | Isensee et al. .............. 345/684 |
| 5,689,718 A | | 11/1997 | Sakurai et al. .............. 707/517 |
| 5,696,915 A | | 12/1997 | Johnston, Jr. et al. ....... 345/804 |
| 5,731,997 A | * | 3/1998 | Manson et al. ............. 702/150 |
| 5,768,578 A | * | 6/1998 | Kirk et al. .................. 707/100 |
| 5,777,616 A | * | 7/1998 | Bates et al. ................. 345/837 |
| 5,801,747 A | | 9/1998 | Bedard ........................ 725/46 |
| 5,859,639 A | | 1/1999 | Ebrahim ..................... 345/788 |
| 5,867,281 A | | 2/1999 | Nozoe et al. ................ 358/402 |
| 5,924,090 A | | 7/1999 | Krellenstein .................... 707/5 |
| 5,937,163 A | | 8/1999 | Lee et al. .................... 709/218 |
| 5,991,799 A | | 11/1999 | Yen et al. .................... 709/218 |
| 6,097,393 A | | 8/2000 | Prouty, IV et al. .......... 345/419 |
| 6,259,443 B1 | | 7/2001 | Williams, Jr. ................ 345/741 |
| 6,271,827 B1 | | 8/2001 | Matsumoto ................. 345/741 |
| 6,275,229 B1 | | 8/2001 | Weiner et al. ............... 345/601 |
| 6,275,266 B1 | | 8/2001 | Morris et al. ............... 348/552 |
| 6,286,141 B1 | | 9/2001 | Browne et al. ............... 725/39 |
| 6,314,415 B1 | * | 11/2001 | Mukherjee .................... 706/47 |

OTHER PUBLICATIONS

Kirste et al., "A Presentation Model for Mobile Information Visualization," 1996 Comput. & Graphics, vol. 20, No. 5, pp. 669–681.

\* cited by examiner

*Primary Examiner*—Raymond J. Bayerl
*Assistant Examiner*—Kieu D. Vu
(74) *Attorney, Agent, or Firm*—Kevin L. Daffer; Daffer McDaniel, LLP; Jeffrey S. LaBaw, IBM

(57) ABSTRACT

A method of display with a graphical user interface includes arranging selectable navigation points along a line configured on a display screen. In some embodiments, the selectable points correspond to pieces of information to be displayed, such that selection of a selectable point causes the corresponding piece of information to be displayed. The selectable points may be arranged along the line according to a priority sequence of the corresponding pieces of information. In other embodiments, the selectable points correspond to functions useful in using an application program. Selection of a selectable point in this embodiment causes the corresponding function to be executed. The line with selectable navigation points may therefore be used in place of other display tools such as toolbars or pull-down menus, and may allow rapid selection of desired options, commands, or information while using a minimum amount of screen space.

28 Claims, 5 Drawing Sheets

|  | Label | Attribute | Value |
|---|---|---|---|
|  | "pointer" | reference/pointer 80 | information unit object handle |
|  | "seqname1" | priority sequence 1 name 76 | "Application C Health Indicators" |
|  | "seqname2" | priority sequence 2 name | "Disk Utilization Indicators" |
| 78 | "priority1" | priority within sequence 1 | priority indicator, e.g. "2" |
|  | "priority2" | priority within sequence 2 | priority indicator, e.g. "3" |

70 = Label, 72 = Attribute, 74 = Value

Fig. 3

ARRANGEMENT OF INFORMATION INTO LINEAR FORM FOR DISPLAY ON DIVERSE DISPLAY DEVICES

RELATED APPLICATIONS

This application is related to the following copending U.S. patent applications, all filed on even date herewith (Nov. 30, 1999): Ser. No. 09/451,948 entitled "Arrangement of Information for Display Into a Continuum Ranging From Closely Related to Distantly Related to a Reference Piece of Information," Ser. No. 09/451,946 entitled "Information Grouping Configuration for Use With Diverse Display Devices," Ser. No. 09/451,949 entitled "Establishment of Information Display Policy for Diverse Display Devices," Ser. No. 09/451,947 entitled "Arrangement of Information for Display Into a Continuum According to Level of Detail," Ser. No. 09/451,941 entitled "Arrangement of Information to Allow Three-dimensional Navigation Through Information Displays," Ser. No. 09/451,945 entitled "Navigation Through Displayed Information Using Minimum Display Screen Area," Ser. No. 09/451,944 entitled "Arrangement of Information to Allow Three-dimensional Navigation Through Information Displays with Indication of Intended Starting Point," Ser. No. 09/451,940 entitled "Graphical Display of Path Through Three-dimensional Organization of Information," and Ser. No. 09/451,943 entitled "Method of Using a Graphical User Interface to Configure Information for Display," all by MacPhail.

BACKGROUND OF THE INVENTION

1. Field of the Invention

This invention relates to display of information, and more particularly to a method of forming a priority sequence of pieces of information so that the pieces of information may be accessed using a line configured on a display screen. Such information display may be useful for multiple applications involving display of information, including platform management in heterogeneous systems.

2. Description of the Related Art

The following descriptions and examples are not admitted to be prior art by virtue of their inclusion within this section.

Continual advances in software and hardware technology have led to a proliferation of available information-based, or information-handling, devices, including computers, telephones, pagers, and personal digital assistants (PDA's). Such devices are increasingly configured with the ability to interact and communicate with one another. For example, electronic mail may currently be sent to some wireless telephones and pagers, and PDA's may be used to access some Internet (also called "World Wide Web" or "web") sites.

Information-handling devices such as those described above generally include display screens for presentation of information to the user. The trend in size of these display screens depends on whether the device is fixed or portable. For example, displays associated with desktop computers are generally getting larger, to provide ease of viewing and/or accommodate increasingly complex applications and operating systems. On the other hand, displays associated with portable devices such as wireless telephones and PDA's are small and often getting smaller, to enhance, e.g., portability and battery life. A severe mismatch between the display sizes of two devices communicating with one another may result from these differing trends.

For a situation in which a device, such as a desktop computer, which is normally configured for a large display transmits information to a device having a small display, this mismatch in display size may be particularly troublesome. Because all of the information viewable on the large display will not fit on the small display, a procedure for sending a manageable amount of information to the small display must be used. For example, the information normally shown on the large display may be divided into portions and sent to the small display sequentially, or some of the information may simply be removed from the information sent to the small display.

Both of these procedures may be disadvantageous for the user of the small display. If some of the information normally shown on a large display is not sent to the small display at all then clearly the user may be denied access to a desired piece of information, and the device having the small display does not provide true access to the information of the large-display device. If the information is instead sent in sequential portions, multiple downloads to the small-display device may be needed before a desired piece of information can be viewed on the small display. Furthermore, pieces of information which are best viewed together may be divided between different portions and shown on the small display at different times.

As an example of interaction between small-display and large-display devices, a system administrator for a computer system or network may connect remotely to a system terminal using, for example, a telephone or PDA. The system terminal typically has a large display screen, facilitating rapid access to the values of system or network variables such as transaction rates, application program status, and disk space availability using, for example, a graphical user interface (GUI). If the system administrator contacts the system terminal remotely in response to notification of a problem with the system or network, there is generally a specific set of variables which the system administrator must observe in order to properly diagnose and/or correct the problem. If some or all of these variables are not sent to the small-display device used by the system administrator until after several other pieces of information are sent, valuable time may be wasted. Furthermore, if the variables relevant to the problem at hand are not displayed together on the small-display device, or at least in close succession, obtaining the needed information may be significantly more difficult and time-consuming than when a large display is used.

In addition to the above-described problems of obtaining specific desired information quickly and efficiently, there are other problems associated with the use of small-display devices. In addition to the limitations imposed by a small display in receiving information from another device, for example, there may be severe limitations in simply displaying the options and/or commands typically used for operation of an application program. For example, the toolbars and pulldown menus used in a typical electronic mail management program generally take up so much screen space that they cannot all be used on a small-display device if any space for actual message display is to be retained. Some of the ways in which options and commands are presented, such as pull-down and pop-up menus, may also be relatively slow and inconvenient to use for selection of a particular option or command. In the case of a pull-down menu, for example, a user must typically use a pointing device to "click" on a word at the top of a menu column. The column below the selected word is then displayed, and the user then typically moves the pointing device along the column to the desired command, and clicks again (alternatively, a pointing device button may be held down after the first click and released to select the desired command). Such a selection sequence can be tedious on any display, and particularly so on a small-display device which may have a somewhat smaller and more awkward pointing device than is typically used with a large display.

It would therefore be desirable to develop a method by which the most relevant pieces of information may be efficiently delivered to users of information-based devices having displays of arbitrary size. It would further be desirable to develop a method by which display of information, options or commands could be done using a minimum amount of screen space. Such a display method would preferably allow simple, rapid selection of displayed material.

SUMMARY OF THE INVENTION

The problems outlined above are in large part addressed by a method of displaying material using selectable navigation points arranged along a line. In some embodiments, the selectable points correspond to pieces of information, or information units, such that selection of a selectable point causes the corresponding piece of information to be displayed. A piece of information or information unit as used herein may take various forms including, for example, a value of a system or network variable being monitored by a system administrator for a computer system, an address (also called a Universal Resource Locator, or URL) of a web page provided by a web search application, or a portion of the material included in a web page. In such an embodiment, the selectable points may be arranged along the line according to a priority sequence of the corresponding pieces of information. Such a priority sequence may be established by assigning information tags, or labels (called priority labels herein), to the pieces of information. The priority sequence is preferably established by a user of a computer system with which the pieces of information are accessed, but may also be established by an organizer of the information or established automatically by, e.g., a computer program.

The ability of the user to establish the priority sequence is believed to be advantageous by allowing a person using a small-display device (or a display of any size) to receive desired pieces of information more efficiently. The priority sequence is linked to a display controller in communication with the display screen on which the information is to be displayed. Because the display controller uses the priority sequence to send the pieces of information in the way specified by the user to the extent practicable, less time may be spent by the user waiting for the desired information to appear on a small display.

The priority labels used to establish a priority sequence are a form of "meta-data", or data about data. In particular, a label preferably corresponds to a particular attribute of the data, and the value of that attribute. The label is linked to the corresponding piece of information. In a preferred embodiment, this linking is implemented by relating the label to a reference or pointer to the piece of information, where the relating is done using some sort of data structure. "Data structure" as used herein refers to a collection of pieces of data (which may be meta-data) and any relationships between the pieces of data. One such data structure may be a rules database which contains rules, or policy, for assigning the priority labels to pieces of information. "Policy" as used herein refers to one or more rules established in advance of a particular situation or event to govern the response of a computer system to that event.

Establishing policy for forming priority sequences of pieces of information may be particularly useful in embodiments for which configuration of ad hoc information is desired. Ad hoc information refers to information generated or organized in response to a particular event or request, as opposed to static information which is always presented in the same form. Examples of ad hoc information include an alarm message generated in response to a failure detected in a monitored system, as might occur in a system administration application, or a list of URL's provided by a search engine in response to specific search criteria given by a user. Pieces of ad hoc information may therefore not exist in advance of a triggering event which gives rise to the ad hoc information. Setting policy for collection of such pieces of information and assignment of labels to them after they are created therefore allows establishment of priority sequences even for pieces of ad hoc information.

In other embodiments of the method of using selectable points along a line for display, the selectable points may correspond to functions executable using a display controller in communication with the display screen. Such functions may be, for example, any functions useful in using an application program. These functions could include opening, saving or printing a file, sending a mail message, formatting text, and innumerable others. In such an embodiment, selection of a selectable point along the displayed line causes the corresponding function to be executed. The line with selectable navigation points may therefore be used in place of other ways of displaying options and commands for operation of programs, such as toolbars, pull-down menus, etc.

A graphical user interface including a line with selectable navigation points, as described above, is believed to allow convenient access to desired information while using a minimum of display space (often called "real estate"). The piece of information or function corresponding to each selectable point may be identified with a visible indicator which appears when a pointing device is used to position a pointer configured on the display screen over the selectable point. Unless the pointer is configured over a selectable point along the line, however, only the line itself is visible (possibly along with small dots marking the navigation points). The pieces of information and/or functions are therefore presented using the extremely small amount of display space taken up by the line. The line may be configured to be scrolled across the display screen, so that many navigation points may be established along a very long line, even though only a portion of the line is visible on the screen at any one time. In some embodiments, the locations of selectable points corresponding to particular functions or pieces of information may be standardized, so that a user may readily learn these locations and quickly make selections without using the visible indicator feature. This standardization may be provided by developers of applications using the line, and/or from customization of the locations by the user. Because selection of a navigation point may be done by simply clicking on the point, selections considerably more rapid than may be performed with other tools such as pull-down menus may be possible.

The methods of configuring information for display and forming a graphical user interface for display as described herein may be particularly advantageous for platform management applications. "Platform management" generally refers to ensuring the effective operation of application programs, systems, or networks on one or more "platforms", where a platform refers to a specific hardware configuration and/or operating system. Platform management may be particularly challenging in systems or networks including multiple heterogeneous platforms. Such systems may also be referred to by other terms, such as "multiple heterogeneous systems," and management of them may also be called, for example, "cross-platform management." Platform management of a multiple heterogeneous system may often involve remote management of at least some parts of the system, and failure detection and reporting become increasingly important with increased system complexity. By facilitating transfer of information from a computer system within such a heterogeneous system to a display device which may be remotely located with respect to the system, the methods described herein are believed to provide advantages in platform management applications.

As an example of such a platform management application, a system administrator may set policy for formation of a priority sequence of particular pieces of information which may be particularly relevant to the performance of a particular application running on a system or network. Such pieces of information may include, for example, transaction rates, available network capacity, and/or available disk space for a given application. The policy could include a rule that in the event a problem arises with the application, the pieces of information in the sequence are to be made available for display in the order specified by the priority sequence. For example, navigation points corresponding to the pieces of information may be established along a line displayed on a display device used by the system administrator, where an order of the navigation points corresponds to the priority sequence. If there are a large number of pieces of information in the priority sequence, such that the corresponding navigation points cannot all be displayed at one time, the line may be scrolled to allow access to all desired pieces of information.

In addition to the methods described above, an information-handling system is contemplated herein. In an embodiment, the system includes a display screen and a display controller in communication with the display screen. The system further includes a means for configuring a line on the display screen, and a means for configuring multiple selectable points along the line, wherein each selectable point corresponds to a function executable using the display controller. In addition, a means for causing the corresponding function to be executed in response to selection of a selectable point is included. The means of configuring a line and selectable points, and causing the function to be executed may include a graphical user interface in some embodiments. The display screen and display controller may be within a single information-handling device, or each be in a different device. In another embodiment, the system includes a means for configuring a line having multiple selectable points on the display screen, wherein each selectable point corresponds to a piece of information accessible using the display controller, and a means for displaying the corresponding piece of information in response to selection of a selectable point.

In addition to the methods and system described above, a computer-usable carrier medium is contemplated herein. The carrier medium may be a storage medium, such as a magnetic or optical disk, a magnetic tape, or a memory. In addition, the carrier medium may be a transmission medium, such as a wire, cable, or wireless transmission path along which the program instructions are transmitted, or a signal carrying the program instructions along such a wire, cable or wireless transmission path. The carrier medium may contain program instructions executable on an information-handling device for implementing the methods described above.

BRIEF DESCRIPTION OF THE DRAWINGS

Other objects and advantages of the invention will become apparent upon reading the following detailed description and upon reference to the accompanying drawings in which:

FIG. 3 illustrates the content of an exemplary data structure which may be included on a carrier medium associated with the computer system or information-handling device of FIG. 1;

Figure 1:
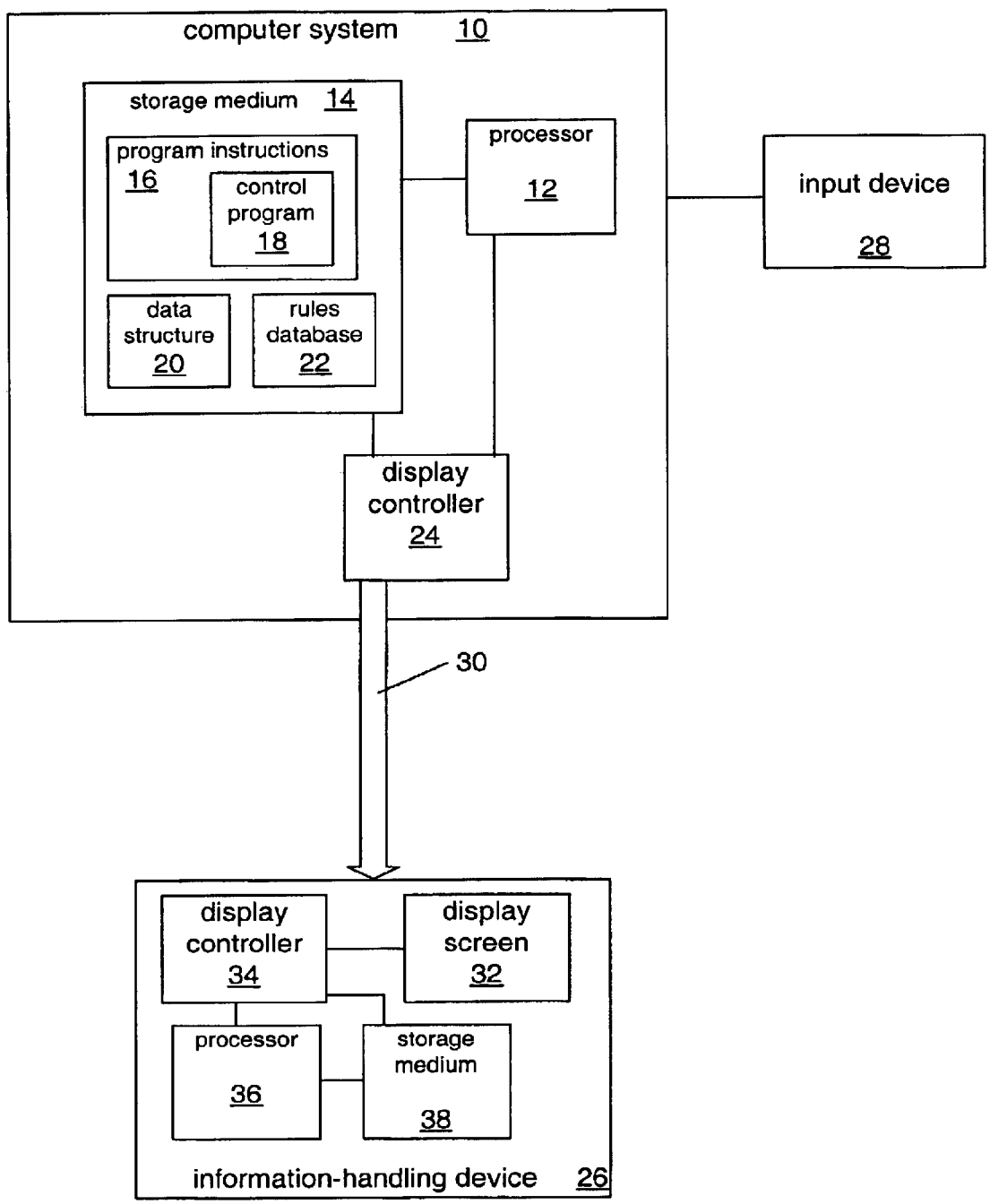
FIG. 1 is a block diagram illustrating an embodiment of a computer system and another information-handling device which may be used to implement the methods described herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover, all modifications, equivalents and alternatives falling within the spirit and scope of the present invention as defined by the appended claims.

DETAILED DESCRIPTION OF THE PREFERRED EMBODIMENTS

A block diagram illustrating an exemplary embodiment of a pair of information-handling devices which may be used in implementing the methods described herein is shown in FIG. 1. As used herein, an information-handling device is a device for storage, manipulation and/or display of information, and may include, e.g., a computer, telephone, PDA, or pager. Computer system 10 is therefore an information-handling device and includes processor 12, which is coupled to storage medium 14 and display controller 24. Storage medium 14 may take many forms, such as volatile or nonvolatile memory, a magnetic disk such as a hard drive or floppy disk, an optical disk, and/or a magnetic tape. Storage medium 14 may include program instructions 16, data structure 20, and/or rules database 22, described in more detail below. Display controller 24 configures data for display on a display device, and may provide an interface between computer system 10 and the display device. In the embodiment of FIG. 1, display screen 32 within information-handling device 26 is the display device used. Display screen 32 may be formed using various technologies, including liquid crystal display (LCD) technology, cathode ray tube (CRT) technology or projection technologies, and may have one of many different sizes. Information-handling device 26 may be another computer or a different type of device, as described above, and may include display controller 34, processor 36 and storage medium 38, which are similar to the corresponding components of computer system 10. In some embodiments, on the other hand, device 26 may be simply a display device (for example, a monitor) without some or all of components 34, 36 and 38. In such an embodiment, device 26 would be controlled by display controller 24 of computer system 10.

In the embodiment of FIG. 1, data structure 20 is a collection of interrelated data stored in storage medium 14.

As described further below in connection with FIG. 3, data structure 20 may include multiple pieces of data and the relationships between them. In particular, data describing priority sequences of pieces of information accessible by computer system 10 may be included in data structure 20. "Accessible by a computer system" or "accessible using a computer system" as used herein refers to information which may be found stored on the computer system or a network associated with the system, or created using the computer system. Information accessible using a computer system is also accessible using a display controller associated with the computer system (e.g., display controller 24) or in communication with the computer system (such as display controller 34). Such priority sequences may additionally or alternatively be stored within rules database 22. In the embodiment of FIG. 1, rules database 22 is a database in which rules are stored which define policy for the prioritizing and display of pieces of information accessible by the computer system. An example of such a rule could be: "if application B fails, display available space on disk A."

Rules database 22 may be accessed by control program 18, which monitors and detects events which may trigger a display of information units. Such an event might be, for example, a message from an application program or operating system of a failure, or an instruction from a user to display a particular piece of information. When a display of pieces of information is indicated, control program 18 may access the rules database to determine the rules applicable to the particular piece of information being displayed, and collect the information needed by display controller 24 to display according to the pre-established policy. This collecting of information may involve the creation of one or more data structures similar to data structure 20, which may be forwarded to display controller 24 so that the appropriate pieces of information may be sent to display screen 32. Such formation of data structures dynamically at such time as they are needed is believed to advantageously allow display policy to be predetermined for even ad-hoc information, which may not exist prior to the time at which its display is required.

As used in the methods described herein, display controller 24 may be linked to storage medium 14. This linkage allows display controller 24 to take into account display policy information which may be included on storage medium 14 when configuring data to forward to display device 32 of information-handling device 26. Display controller 24 and information-handling device 26 are connected by carrier medium 30, in this case a transmission medium. Carrier medium 30 may therefore include a wire, cable, or wireless transmission path, or a signal traveling along such a wire, cable or wireless path. In embodiments for which information-handling device 26 is remotely located with respect to computer system 10, carrier medium 30 may contain both "wired" and wireless portions. Computer system 10 may be connected to at least one input device 28 through which a user may enter information into the computer. Input device 28 may be a device used for manual entry of information, such as a keyboard or pointing device, or a device such as a disk drive or tape drive for receiving stored information. In some embodiments, a user may also input information using information-handling device 26, over a transmission medium similar to carrier medium 30.

It is noted that a computer system suitable for the methods described herein may include other components not explicitly shown. For example, other input/output devices and/or interfaces may be included. Furthermore, in the block diagram of FIG. 1 the blocks are intended to represent functionality rather than specific structure. Implementation of the represented system using circuitry and/or software could involve combination of multiple blocks into a single circuit or program, or combination of multiple circuits or programs to realize the function of a block. For example, storage medium 14 may include memory associated with various elements, including processor 12 and display controller 24. Furthermore, the elements within computer system 10 may be related using various levels of integration. For example, storage medium 14, processor 12, and display controller 24 may be integrated onto a single board or a single chip, or, alternatively, may not be within the same case. Storage medium 14, for example, may be external to the case of computer system 10, particularly in embodiments for which it is a disk or tape. In some embodiments of the methods described herein, a different information-handling device could be used instead of computer system 10.

Figure 2A:
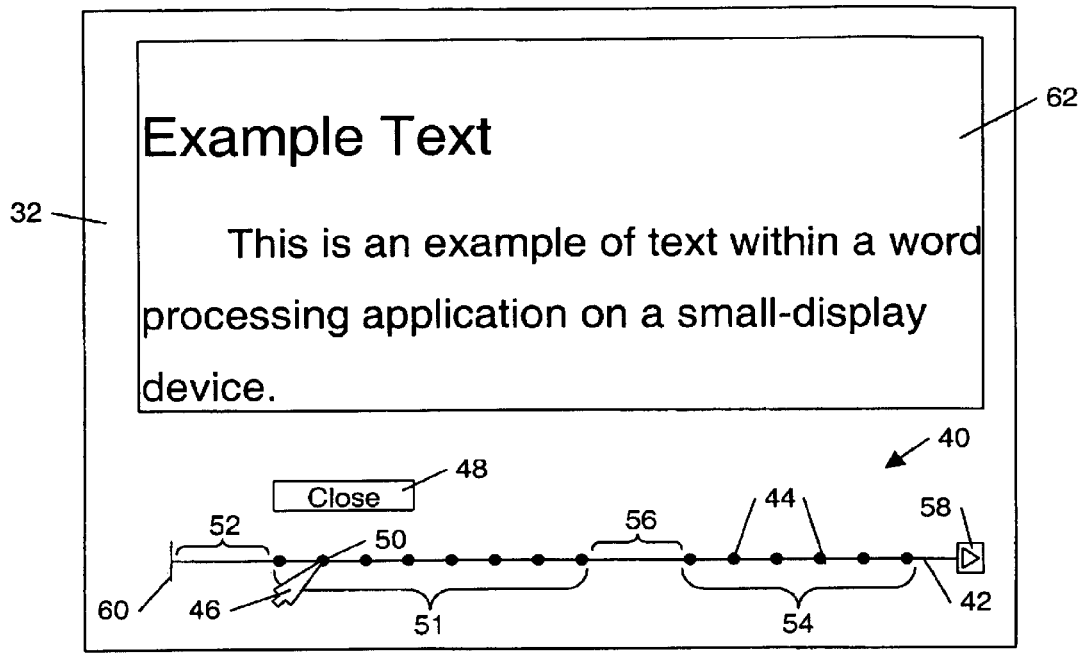
FIG. 2 illustrates exemplary graphical user interfaces according to embodiments of the methods recited herein.

Turning now to FIG. 2, examples of information display on a screen such as display screen 32 of FIG. 1 are shown. In each embodiment shown, a GUI 40 includes a line 42 and selectable navigation points 44. A pointer 46 configured on the screen may be used to select one of selectable points 44. Such selection is typically performed by using a pointing device, such as a mouse or trackball, to manipulate a pointer such as pointer 46. When pointer 46 is positioned over the desired selectable point, an actuator (such as a button) associated with the pointing device is exercised to make the selection. In the embodiment of FIG. 2a, visible indicator 48 appears while pointer 46 is positioned over selectable point 50 (one of selectable points 44). Indicator 48 characterizes a function corresponding to selectable point 50, in this embodiment, where the function is closing of a file. This display of a visible indicator while a pointer is positioned over an object on a display screen may function in a similar manner to a "mouseover" in the JavaScript language, and may in some embodiments be implemented in this form. Visible indicators such as indicator 48 may allow rapid identification of selectable points along line 42. Experienced users of GUI 40 may learn the positions of desired selectable points such that visible indicators are not necessary. In some embodiments for which visible indicators are used, a slight delay could be used between the alignment of the pointer over a selectable point and the appearance of the indicator (for example, a delay of about one-half of a second may be suitable). In this way, more experienced users may rapidly select desired selectable points without viewing the corresponding visible indicators, while less experienced users may still have access to the indicators for assistance in identifying desired selectable points.

In the embodiment of FIG. 2a, selectable navigation points 44 are clustered along line 42 into groups 51 and 54. Group 51 in this embodiment may include selectable points corresponding to functions typically found in the "File" menu of a word processing application (e.g., "Open", "Close", "Save", "Print", etc.). In an embodiment, GUI 40 may be adapted such that positioning pointer 46 over portion 52 of line 42 to the left of group 51 causes display of a visible indicator characterizing group 51. For example, such a visible indicator could include the word "File". Similarly, positioning of pointer 46 over portion 56 of line 42 to the left of group 54 of selectable points could cause the display of a visible indicator characterizing group 54. Group 54 could include, for example, selectable points corresponding to functions typically displayed under the "Edit" or "Text" menus of a word processor. Further selectable points along line 42 may be viewed using scroll icon 58 of FIG. 2a. In the embodiment of FIG. 2a, selecting scroll icon 58 causes a different portion of line 42 to be displayed on screen 32. In particular, a portion containing selectable points to the right of the points in group 54 may be displayed. Use of scroll icon 58 thereby effectively shifts line 42 to the left so that a different portion of it may be viewed. Such a shift may cause some or all of the selectable points of group 51 to be removed from view. In this case, endpoint indicator 60 may be replaced with a scroll icon similar to icon 58, but pointed in the opposite direction.

In the embodiment of FIG. 2a, GUI 40 is used for selection of functions, i.e., options or commands, used in operation of an application program (in this case, a word processing program). The data acted upon by the functions is also displayed on screen 32, possibly in a window such as window 62 of FIG. 2a. In a different embodiment shown in FIG. 2b, GUI 40 is used for selection of pieces of information to be displayed on screen 32. In a similar manner as shown in FIG. 2a, selectable navigation points 44 are arranged along line 42. Visible indicator 66 is displayed while pointer 46 is positioned above navigation point 64, where point 64 corresponds to piece of information 68 involving utilization of Drive C. Piece of information 68 is displayed on screen 32 in response to selection of selectable point 64. Scroll icons 58 allow scrolling of line 42 to bring additional points 44 into view, in a manner similar to that described above in the discussion of FIG. 2a.

The graphical user interfaces of FIG. 2 are merely exemplary embodiments, and may be implemented in various ways. For example, selectable points 44 may not be marked with dots in some embodiments, but could, for example be implemented as short segments of line 42. Such segments could in some embodiments be distinguished using, e.g., color variations. Furthermore, the various icons and indicators shown in FIG. 2, such as scroll icon 58, pointer 42, visible indicators 48 and 66 or endpoint indicator 60, could all have different shapes than those shown in FIG. 2. As at least partially illustrated by FIG. 2, line 42 may be arranged in various orientations within display screen 32 (vertically, horizontally, or along any desired path).

Figure 2B:
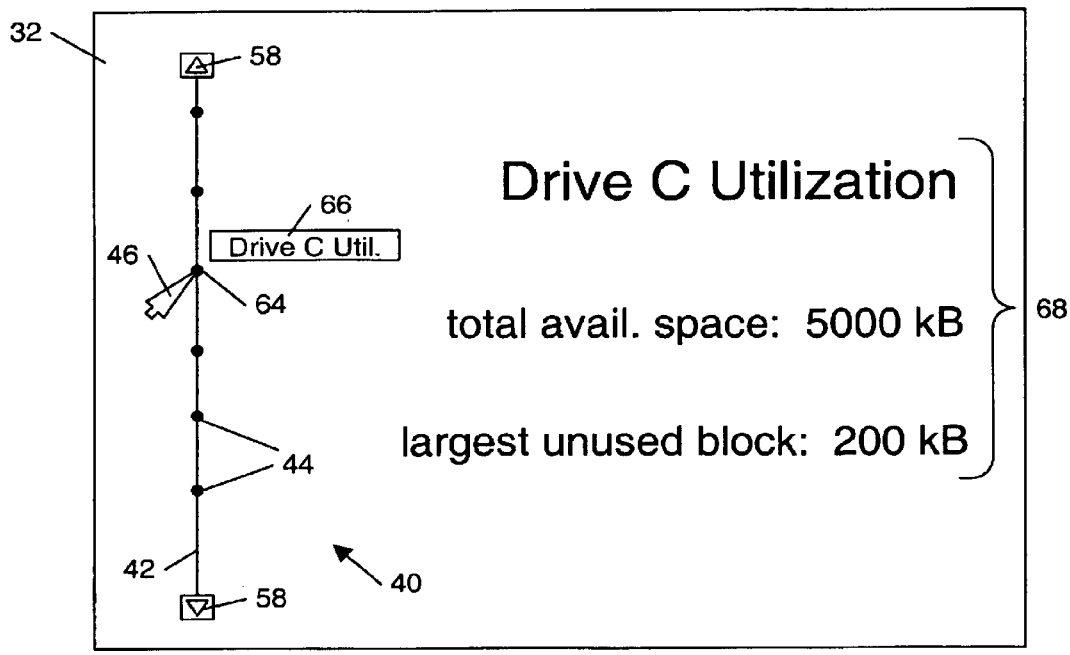

The ordering of selectable points 44 along line 42 in FIG. 2b may be determined from a priority sequence of the corresponding pieces of information. Such a priority sequence may be established using one or more data structures relating the pieces of information to values of a priority attribute corresponding to a priority label assigned to each piece of information. An example of the contents of such a data structure is shown in FIG. 3. The table of FIG. 3 includes data which may be included in a data structure corresponding to a particular information unit, or piece of information. Such a data structure may be employed, for example, when an object-oriented approach is used to implement the methods described herein. In such an approach, each piece of information may be considered an "object". The data of FIG. 3 may be used to define attributes of such an object. In the embodiment of FIG. 3, each of the labels 70 assigned to an information unit corresponds to an attribute 72 and a value 74 of that attribute. For example, the value of priority sequence 1 name attribute 76 is "Application C Health Indicators" in the embodiment of FIG. 3. (Quotation marks are used in FIG. 3 to denote actual exemplary values, while entries not in quotation marks are descriptions of a suitable value.) A second priority sequence name attribute has the value "Disk Utilization Indicators". The piece of information referenced by the data structure might in this case represent the space available on a particular disk which is accessed by application C. Display of the piece of information may therefore be desirable both in the context of monitoring the health of application C, and for overall monitoring of disk utilization in the computer system.

Priority labels 78, "priority1" and "priority2" in this embodiment, correspond to attributes describing the priority of the piece of information within each of the two sequences. The value of each of these attributes is a priority indicator, such as a number or other character which may be sequenced (e.g., a letter). The piece of information described by the attributes and values of FIG. 3 is referenced by the value of reference/pointer attribute 80, where the value is the object handle of the piece of information. An object handle as used in an object-oriented programming approach may be considered a name (typically an alphanumeric character, word, or phrase) used to reference the object. Operations performed with respect to the object are described by a programmer in terms of the object handle. The object handle is associated with the actual object using, e.g., some sort of data structure. The object handle may be stored in a completely different storage location than that used to store the actual object, however.

The content and length of a piece of information, such as those to which the attributes in FIG. 3 correspond, may vary significantly depending on the application for which information is configured for display. For example, a piece of information may include a number representing a quantity such as available disk space, an alphanumeric Internet site address, alphanumeric words and/or phrases displayed on a web page, or an entire electronic mail message or other document. The methods described herein of establishing priority sequences of information for display and displaying material using a line may be combined with methods of setting information display preferences. Display preferences which may, for example, be advantageous in viewing information on small-display devices may include grouping arrangements and/or preferred positions of pieces of information on a display screen. Label assignments used to establish such preferences may be included in some embodiments with data such as that of FIG. 3 establishing priority sequences. In other embodiments for which pieces of information are relatively large, a piece of information may be divided into sub-units, and data structures similar to that of FIG. 3 may be used to establish display preferences for the sub-units. The data structure content of FIG. 3 is merely exemplary, and data structures including such data may be implemented in various configurations. Alternatively or in addition to the object-oriented approach suggested by FIG. 3, for example, other data structure forms may be used. For example, a look-up table including multiple pieces of information and the associated priority labels could be formed.

In embodiments for which the pieces of information to be displayed constitute ad hoc information, a priority sequence typically cannot be formed by assigning priority labels to existing pieces of information, because at least some of the pieces of information may not exist in advance of a triggering event. Possible triggering events may include, for example, detection of a failure by an application program monitoring the performance of a system (such as a computer system or network) or execution of an Internet search program to generate search results. Priority sequences for ad hoc information may therefore be formed by setting policy in advance, where the policy provides rules for forming priority sequences of pieces of information after they are created. The data of FIG. 3, for example, may be put into a data structure by a control program such as control program 18 of FIG. 1. The control program may access policy stored in, for example, a rules database to obtain rules for forming such a data structure.

Figure 4:
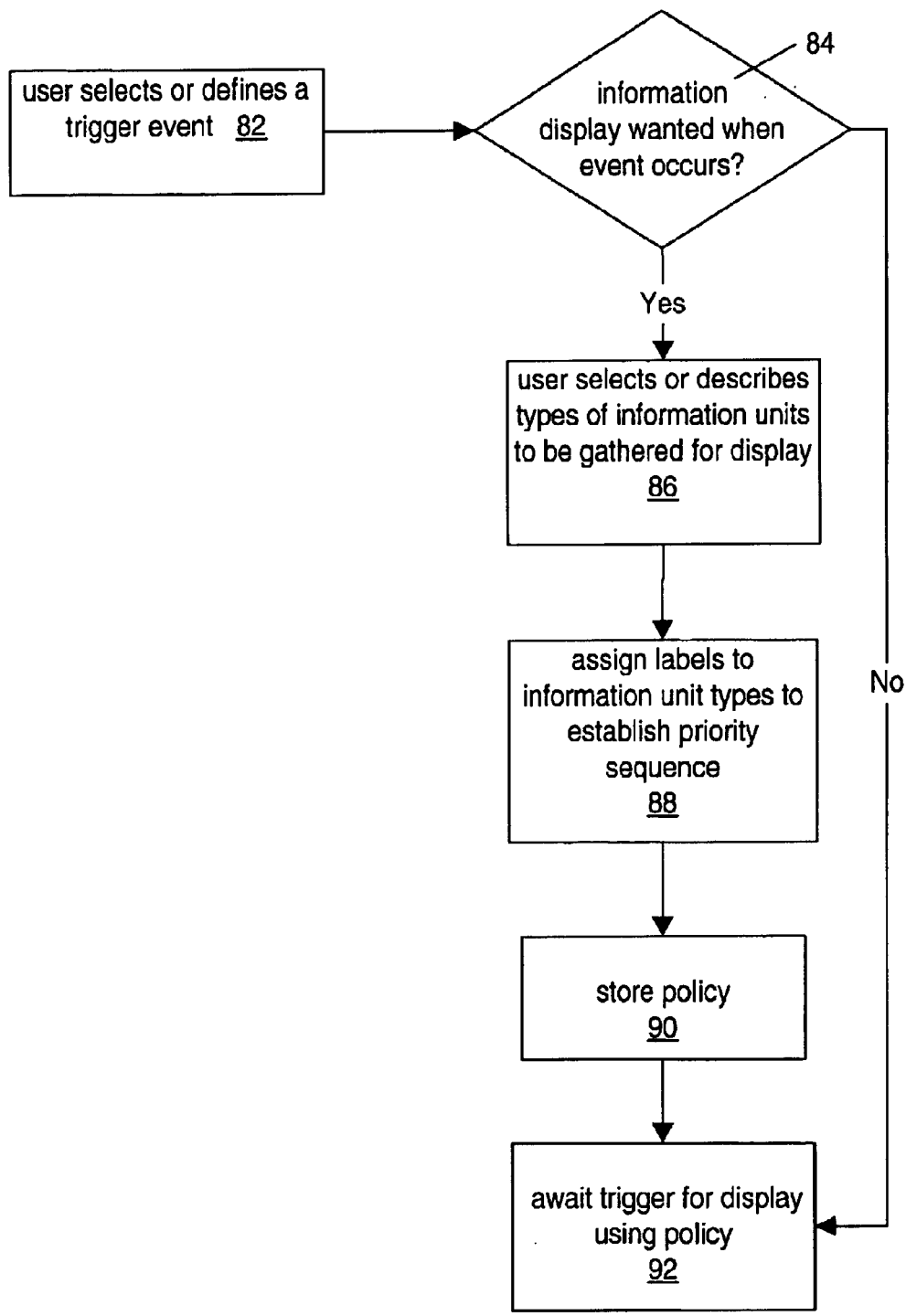
FIG. 4 is a flow diagram illustrating a method of configuring information for display.

Turning now to FIG. 4, a flow diagram illustrating a method of setting policy for forming a priority sequence of pieces of information is shown. In the embodiment of FIG. 4, a trigger event is defined by a user of an information-handling device, i.e., a potential viewer of the displayed information (box 82). If display of information in response to this trigger event is desired (decision box 84), the user selects or describes the types of information units to be gathered for display (box 86). The types of information units are selected in the case of ad hoc information, since the actual information units (pieces of information) may not exist at the time the policy is set. Priority labels, and the corresponding attributes and values, are assigned to the information unit types to establish a priority sequence (box 88). This assignment of labels may involves entering the labels into a rules database or other data structure relating the labels to the information unit types, where the labels are similar to priority labels 78 of FIG. 3. In an embodiment for which the pieces of information are static information, the priority labels may be assigned directly to the pieces of information.

The display policy including the priority sequence information is stored (box 90) in, for example, a rules database similar to database 22 of FIG. 1, and/or in one or more data structures similar to data structure 20 of FIG. 1. This storage of the priority sequence serves to link the priority sequence to a display controller, such as controller 24 of FIG. 1. The information forwarded to the display controller may be in the form of a markup language document, such as an Extended Markup Language (XML) document. In such an embodiment, the priority labels may be used as tags in the markup language document. In an embodiment of the method of FIG. 4, a control program similar to control program 18 of FIG. 1 uses rules within a rules database to collect the information needed for a display of information. The display of information may be in response, for example, to an event detected by the control program. The control program may create one or more data structures with the collected information. In some embodiments, data structures such as that of FIG. 3 are not created until such time as a display of the corresponding information units is needed. This may occur particularly in the case of ad-hoc information. After the policy is stored, a trigger event for a display of information is awaited (box 92). Performing the method of FIG. 4 may involve use of a configuration or "setup" routine associated with, e.g., an application program or operating system. Such a configuration or setup routine may employ a GUI using, e.g., icons to represent information units, labels and/or attributes. In this way, an intuitive manner of establishing a display policy may be provided, and the establisher of the priority sequence may not need to directly access an entity such as a data structure or rules database.

Figure 5:
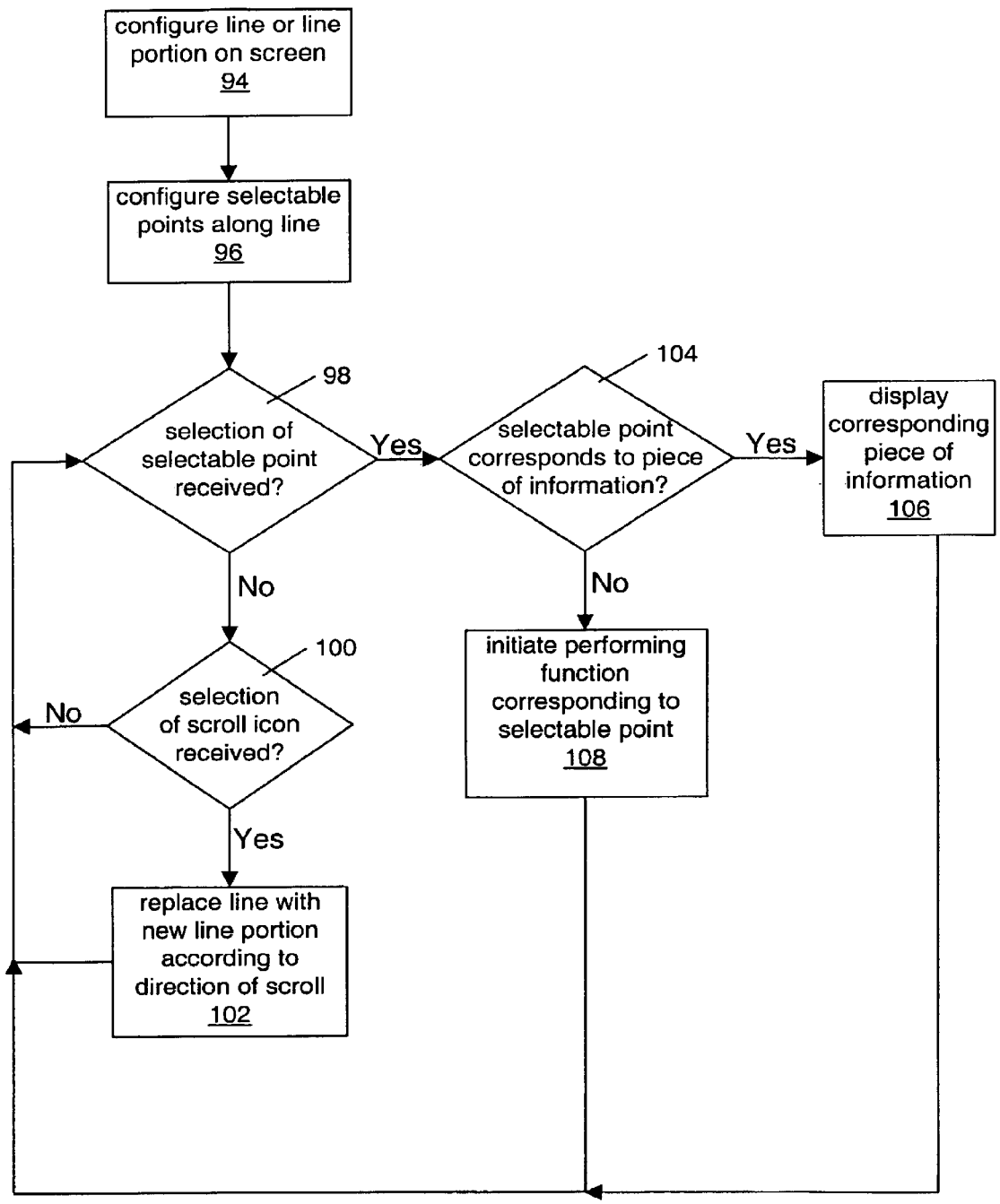
FIG. 5 is a flow diagram illustrating a method of forming a graphical user interface.

An embodiment of a method for forming a graphical user interface is shown in FIG. 5. The method of FIG. 5 is typically performed by a processor and/or display controller in communication with a display screen. In the embodiment of FIG. 5, a line, or portion of a line, is configured on a display screen (box 94), and multiple selectable navigation points are configured along the line (box 96). If selection of a selectable point is received (yes branch of decision box 98), it is determined whether the selectable point corresponds to a piece of information to be displayed (decision box 104). If so, the corresponding piece of information is displayed on the display screen (box 106), at which time an additional selection of a navigation point is awaited. If the selected navigation point does not correspond to a piece of information (no branch of decision box 104), it is assumed in the embodiment of FIG. 5 that some other function corresponds to the navigation point, and performance of the function is initiated (box 108). If selection of a scroll icon, such as icon 58 in FIG. 2, is received (decision box 100), the displayed line is replaced with a new line portion corresponding to the previously undisplayed portion of the line "uncovered" by selection of the scroll icon, as discussed above in the description of FIG. 2. The new line portion may contain additional selectable points, which may subsequently be selected. The method illustrated by the flow chart of FIG. 5 is merely an exemplary embodiment, and many variations are possible. For example, adjacent display steps such as 94 and 96 may be performed in the reverse order or simultaneously.

Program instructions implementing methods such as those described above may be transmitted over or stored on a carrier medium. The carrier medium may be a transmission medium such as a wire, cable, or wireless transmission link, or a signal traveling along such a wire, cable or link. Transmission medium 30 of FIG. 1 is an example of such a transmission medium. The carrier medium may also be a storage medium, such as a read-only memory, a random access memory, a magnetic or optical disk, or a magnetic tape, similar to storage medium 14 of FIG. 1.

It will be appreciated by those skilled in the art having the benefit of this disclosure that this invention is believed to provide a method for displaying material using selectable navigation points arranged along a line. Furthermore, it is also to be understood that the form of the invention shown and described is to be taken as exemplary, presently preferred embodiments. Various modifications and changes may be made without departing from the spirit and scope of the invention as set forth in the claims. For example, although the methods described herein are believed to be advantageous for transfer of information from a computer system having a large display to an information-based device having a small display, the methods may be used for data transfer between devices having any relative display size relationship. Furthermore, the system and methods described herein may be implemented using many combinations of hardware and/or software, and at one or more of many different levels of hardware and/or software, as is the case with many computer-based applications. It is intended that the following claims be interpreted to embrace all such modifications and changes.

What is claimed is:

1. A method of forming a graphical user interface, comprising:
   configuring a line on a display screen which is in communication with a display controller; and
   configuring multiple selectable points along the line, wherein each selectable point corresponds to a piece of information accessible using the display controller, wherein said each selectable point does not comprise alphanumeric characters, and wherein the graphical user interface is adapted to display the corresponding piece of information in response to selection of a selectable point.

2. The method as recited in claim 1, wherein the display screen and the display controller are included within the same information-handling device.

3. The method as recited in claim 2, wherein the information-handling device comprises a computer system, telephone, personal digital assistant or pager.

4. The method as recited in claim 1, wherein the display screen and the display controller are each included within a different information-handling device.

5. The method as recited in claim 1, wherein the graphical user interface is adapted for a correspondence between the selectable points and the pieces of information to be established by a user of the graphical interface.

6. The method as recited in claim 1, wherein the graphical user interface is adapted for the correspondence between the selectable points and the pieces of information to be established according to a priority sequence of the pieces of information, wherein the priority sequence is formed using input from a user of the graphical user interface.

7. The method as recited in claim 1, further comprising displaying a visible indicator while a pointer configured on the display screen is aligned over a selectable point, wherein said visible indicator characterizes the corresponding piece of information.

8. The method as recited in claim 1, wherein only a portion of the line is displayed on the display screen at one time, and further comprising configuring a scroll icon on the line at an edge of the display screen, wherein the graphical user interface is adapted to cause the line to be moved when the scroll icon is selected, so that a previously undisplayed portion of the line is shown on the display screen.

9. A method of configuring information for display, comprising:
   forming a priority sequence of multiple pieces of information accessible using a computer system by assigning a priority label to each of the multiple pieces of information; and
   linking the priority sequence to a display controller associated with the computer system, wherein the display controller is adapted to configure selectable points corresponding to the multiple pieces of information along a line displayed on a display screen in communication with the display controller, wherein each selectable point does not comprise alphanumeric characters, and wherein the order of the selectable points along the line is established by the priority sequence of the corresponding pieces of information.

10. The method as recited in claim 9, wherein the priority label is assigned according to a policy set by a user of the computer system, and wherein the policy is adapted for at least one of the multiple pieces of information to be created subsequent to setting of the policy.

11. The method as recited in claim 10, wherein said setting of the policy comprises entering rules into a rules database associated with the computer system, wherein the rules characterize collection of the at least one of the multiple pieces of information in response to an instruction for display of the at least one of the pieces of information, and wherein the rules are adapted for the instruction for display to occur after said entering rules.

12. The method as recited in claim 9, wherein the priority label describes an attribute of a corresponding piece of information and a value of the attribute.

13. The method as recited in claim 9, wherein the priority label is entered into a data structure relating the label to a piece of information.

14. The method as recited in claim 9, wherein the priority label is entered into a rules database relating the label to a piece of information.

15. The method as recited in claim 9, wherein the computer system is adapted for said forming a priority sequence to be done according to input from a user of the computer system.

16. The method as recited in claim 15, wherein the computer system is adapted for said forming a priority sequence to be done according to input from a system administrator for the computer system.

17. The method as recited in claim 16, wherein said pieces of information comprise a system or network quantity.

18. The method as recited in claim 17, wherein said system or network quantity comprises a transaction rate or an amount of available disk space.

19. An information handling system, comprising:
   a display screen;
   a display controller in communication with the display screen;
   a means for configuring a line on the display screen;
   a means for configuring multiple selectable points along the line, wherein each selectable point corresponds to a piece of information accessible using the display controller, and wherein said each selectable point does not comprise alphanumeric characters; and
   a means for displaying the corresponding piece of information in response to selection of a selectable point.

20. The system as recited in claim 19, wherein the display screen and display controller are included within the same information-handling device.

21. The system as recited in claim 20, wherein the information-handling device comprises a computer system, telephone, personal digital assistant or pager.

22. The system as recited in claim 19, wherein the display screen and the display controller are each included within a different information-handling device.

23. The system as recited in claim 19, further comprising a means for displaying a visible indicator while a pointer configured on the display screen is aligned over a selectable point, wherein said visible indicator characterizes the corresponding piece of information.

24. The system as recited in claim 19, further comprising a means for configuring a scroll icon on the line at an edge of the display screen, and a means for moving the line in response to selection of the scroll icon, such that a previously undisplayed portion of the line is shown on the display screen.

25. A computer-usable carrier medium, comprising:
   first program instructions executable for configuring a line on a display screen in communication with a display controller;
   second program instructions executable for configuring multiple selectable points along the line, wherein each selectable point corresponds to a piece of information accessible using the display controller, and wherein said each selectable point does not comprise alphanumeric characters; and
   third program instructions executable on the information-handling device for displaying the corresponding piece of information in response to selection of a selectable point.

26. The carrier medium as recited in claim 25, further comprising fourth program instructions executable for displaying a visible indicator while a pointer configured on the display screen is aligned over a selectable point, wherein the visible indicator characterizes the corresponding piece of information.

27. The carrier medium as recited in claim 25, further comprising fourth program instructions executable for configuring a scroll icon on the line at an edge of the display screen, and fifth program instructions executable for moving the line when the scroll icon is selected, such that a previously undisplayed portion of the line is shown on the display screen.

28. A computer-usable carrier medium, comprising:
   first program instructions executable for forming a priority sequence of multiple pieces of information accessible using a computer system by assigning a priority label to each of the multiple pieces of information; and second program instructions executable for linking the priority sequence to a display controller associated with the computer system, wherein the display controller is adapted to configure selectable points corresponding to the multiple pieces of information along a line displayed on a display screen in communication with the display controller, wherein each selectable point does not comprise alphanumeric characters, and wherein the order of the selectable points along the line is established by the priority sequence of the corresponding pieces of information.

* * * * *